United States Patent [19]
Armenoff et al.

[11] Patent Number: 6,141,861
[45] Date of Patent: Nov. 7, 2000

[54] APPARATUS AND METHOD FOR CONTROL OF ROLLER CHAIN ASSEMBLY

[75] Inventors: David C. Armenoff, Greenwood; David J. Frey, Indianapolis, both of Ind.

[73] Assignee: AMSTED Industries Incorporated, Chicago, Ill.

[21] Appl. No.: 08/925,217

[22] Filed: Sep. 8, 1997

[51] Int. Cl.[7] .................................................. B23P 15/00
[52] U.S. Cl. .......................... 29/712; 29/407.08; 29/714; 29/718
[58] Field of Search ............................. 29/701, 702, 709, 29/711, 712, 714, 718, 407.01, 407.08, 407.09, 407.1; 59/7, 8, 13, 15, 25, 35.1

[56] References Cited

U.S. PATENT DOCUMENTS

| | | | |
|---|---|---|---|
| 3,695,096 | 10/1972 | Kutsay | 73/88.5 R |
| 3,825,811 | 7/1974 | Smith et al. | 318/646 |
| 4,750,131 | 6/1988 | Martinez | 364/476 |

FOREIGN PATENT DOCUMENTS

| | | |
|---|---|---|
| 0 304 623 | 3/1989 | European Pat. Off. . |
| 36 29 613 | 3/1988 | Germany . |
| 38 20 543 | 12/1989 | Germany . |
| 41 00 410 | 7/1992 | Germany . |
| 196 22 390 | 12/1996 | Germany . |
| 53-21471 | 2/1978 | Japan . |
| 61-8113 | 1/1986 | Japan . |
| 64-9027 | 1/1989 | Japan . |
| 3-243300 | 10/1991 | Japan . |
| WO 93 13935 | 7/1993 | WIPO . |

OTHER PUBLICATIONS

European Search Report; EPO Form 1503.03.82 (P04C01) and EPO Form P0459; Dated Dec. 16, 1998.

*Primary Examiner*—Irene Cuda
*Attorney, Agent, or Firm*—Edward J. Brosius; F. S. Gregorczyk; Stephen J. Manich

[57] ABSTRACT

An improved assembly apparatus and method of assembling workpieces together. The apparatus includes a drive linkage with a linearly movable ram for pushing one workpiece toward the other. The drive linkage also includes a rotatable drive train. In the improved assembly apparatus, a transducer is provided to determine the load existing in the drive linkage, and a resolver is provided to determine the stage of the assembly cycle. A programmable controller is used to correlate this information, and a device is provided for communicating a message related to the correlated information. The transducer may be a strain measuring device or a pressure transducer measuring the pressure in an hydraulic cylinder in the drive linkage. The communications device may be a visual monitor, alarm, recording device, or similar communicator. The system may include a data storage device to receive information on the preferred load or range of loads so that the programmable controller may retrieve this data and compare it to the existing load and warn of or record any undesirable deviation. In the method, the load in the drive linkage is determined, the rotational position of a part of the rotational drive linkage is determined, and this data is correlated and an appropriate communication is made. The apparatus and method may be useful in assuring that a preferred minimum load is applied during assembly for quality control.

17 Claims, 7 Drawing Sheets

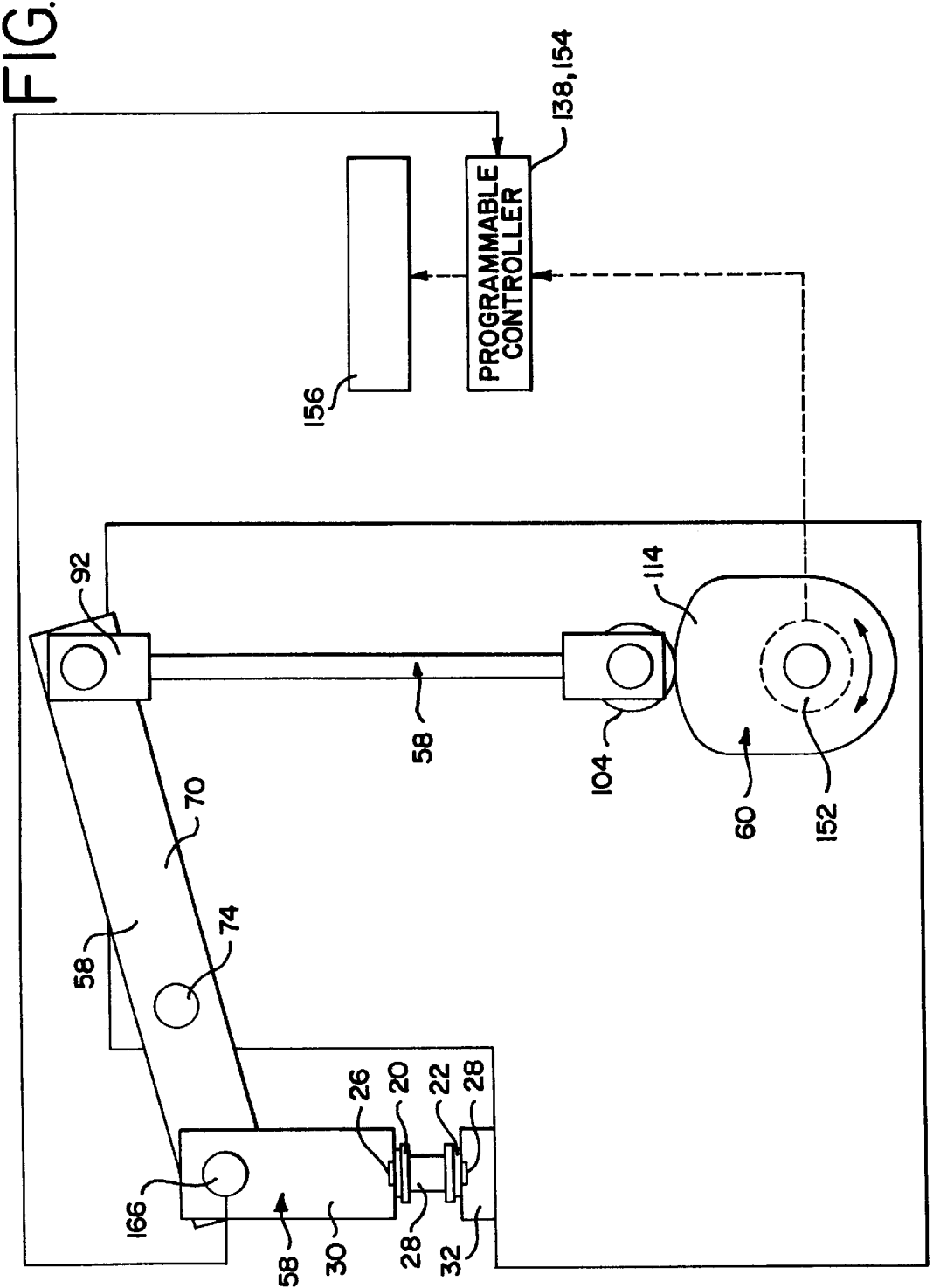

APPARATUS AND METHOD FOR CONTROL OF ROLLER CHAIN ASSEMBLY

FIELD OF THE INVENTION

The present invention relates to press-fit assembly equipment used to apply a force to components to be fit together. More particularly, the invention relates to such equipment used to assemble load-bearing products such as roller chain and to the monitoring of the press-fits of roller chain components during the assembly process.

BACKGROUND OF THE INVENTION

Press-fit assembly devices are known in the art, and have been used to press one component into another to assemble the components together into a product. To get a good fit between the components, that is, a fit that meets anticipated loading, a minimum pressure must generally be applied to the components being assembled; otherwise, the components could come apart or otherwise fail in use. Thus, it has been desirable to monitor the pressure applied during assembly to ensure that the product meets design criteria.

Press-fit equipment is frequently used in assembling load-bearing products such as roller chain. Roller chain is assembled by pressing bushings into the pitch holes of roller linkplates and pressing pins into the pitch holes of pin link plates. The basic integrity of the chain relies on the control of these press fits. Too little force in the press fit operation can result in premature failure of the chain. Too much force in the press fit operation can damage chain components and can damage the tooling used to assembly the chain.

In assembling products such as roller chain, hydraulic press equipment could be used, allowing for a constant or periodic monitoring of the pressures used in assembling the parts being produced. However, mechanical press equipment is generally more productive, producing a greater number of parts per unit of time. In addition, in an assembly line with multiple press-fit devices arranged for serial operations, it is frequently critical that the timing of each press station be coordinated with the operation of the adjacent station or stations. While mechanical presses can be readily tied together to keep them in phase, it poses more of a problem to maintain a group of hydraulic presses in phase.

While mechanical presses may be more efficient than hydraulic ones, determining whether sufficient pressure was applied by the mechanical press for producing a strong fit is problematic. In addition, care must also generally be taken to assure that the pressure applied is not so great as to damage the components. Moreover, if the components and press pieces are not properly aligned, an excessive pressure may be developed that could damage the press equipment.

SUMMARY OF THE INVENTION

One object of the present invention is to provide an efficient assembly apparatus and method that allow for monitoring load pressure applied by the apparatus while achieving efficient production rates.

In one aspect, the present invention provides an assembly apparatus having a drive linkage for applying a load to workpieces. The drive linkage includes a linearly movable ram and a rotatable drive train for moving the ram between a plurality of positions toward and away from the workpieces during an assembly cycle. The drive linkage includes means for translating rotational movement of the rotatable drive train into the linear movement of the ram, and the assembly apparatus includes at least one additional linearly movable element mechanically tied to the rotatable drive train for movement between a plurality of positions during the assembly cycle. The movement of the additional linearly movable element is coordinated with the movement of the ram. The apparatus includes a motor for rotation of the rotatable drive train for movement of the ram and the additional linearly movable element. The apparatus also includes means for determining the load existing in the drive linkage, means for determining the stage of the assembly cycle, and means for communicating information related to the existing load as determined. The load-determining means operates by detecting a characteristic of an element other than the motor.

In another aspect, the present invention provides a method of assembling workpieces through use of an apparatus having a plurality of assembly stations. Each assembly station has a fixture by which a workpiece is supported and a drive linkage including a linearly movable ram for pushing one of the workpieces toward the other workpiece. The ram is movable between different positions during the assembly cycle. The drive linkage includes a rotatable part connected to drive the linearly movable ram. The method includes the steps of determining the load existing in the drive linkage for each assembly station. The rotational position of the rotatable part of the drive linkage of each assembly station is determined to determine the stage of the assembly cycle for the existing load determined for each assembly station. Correlation is made between the information related to the existing load and assembly cycle stage for each assembly station. Information is communicated related to the existing load at each assembly station.

In another aspect, the present invention provides an apparatus for assembling a product comprised of a plurality of workpieces. The apparatus operates in an assembly cycle having a plurality of stages and includes a plurality of assembly stations. The assembly stations are serially-arranged. Each assembly station includes a drive linkage including a rotatable drive train and a linearly movable ram driven by the rotatable drive train. Each linearly movable ram is movable between a plurality of positions including a load-applying position during the assembly cycle. Each assembly station has non-rotating elements including a fixture and a load-transmitting element in the drive linkage between the ram and the rotatable drive train. The rams are positioned so that they do not apply opposing loads. The rotatable drive trains of the assembly stations are mechanically tied together for coordinated rotation of the drive trains so that movement of the ram of one assembly station is coordinated with movement of the ram of the other assembly station. Each assembly station includes means for determining the load existing in the drive linkage by detecting a characteristic of one of the non-rotating elements. Each assembly station also includes means for determining the stage of the assembly cycle of that assembly station. The apparatus includes means for correlating the stages of the assembly cycle and existing loads as determined and means for communicating information related to the existing loads as determined.

In another aspect, the present invention provides an apparatus for assembling roller chain. The chain is comprised of a plurality of bushings press-fit into roller link plates and pins press-fit into pin link plates. The apparatus operates in an assembly cycle having a plurality of stages. The apparatus includes a plurality of assembly stations. Each assembly station includes a drive linkage. Each drive linkage includes a rotatable drive train and a linearly movable ram driven by the rotatable drive train. Each linearly movable ram is movable between a plurality of positions including a load-applying position during the assembly cycle. Each assembly station has a plurality of non-rotating elements. The non-rotating elements include a fixture and a load-transmitting element in the drive linkage between the ram and the rotatable drive train. The rotatable drive trains of the assembly stations are mechanically tied together for coordinated rotation of the drive trains so that movement of the ram of one assembly station is coordinated with movement of the ram of the other assembly station. At least one of the assembly stations defines a press-fit station for press-fitting link plates and another element together. The press-fit station includes means for determining the load existing in the drive linkage. The apparatus includes means for determining the stage of the assembly cycle, means for correlating the stage of the assembly cycle and existing load as determined and means for communicating information related to the existing load as determined.

BRIEF DESCRIPTION OF THE DRAWINGS

FIG. 8 is a schematic of another embodiment of the assembly apparatus of the present invention.

DETAILED DESCRIPTION

Figure 1:
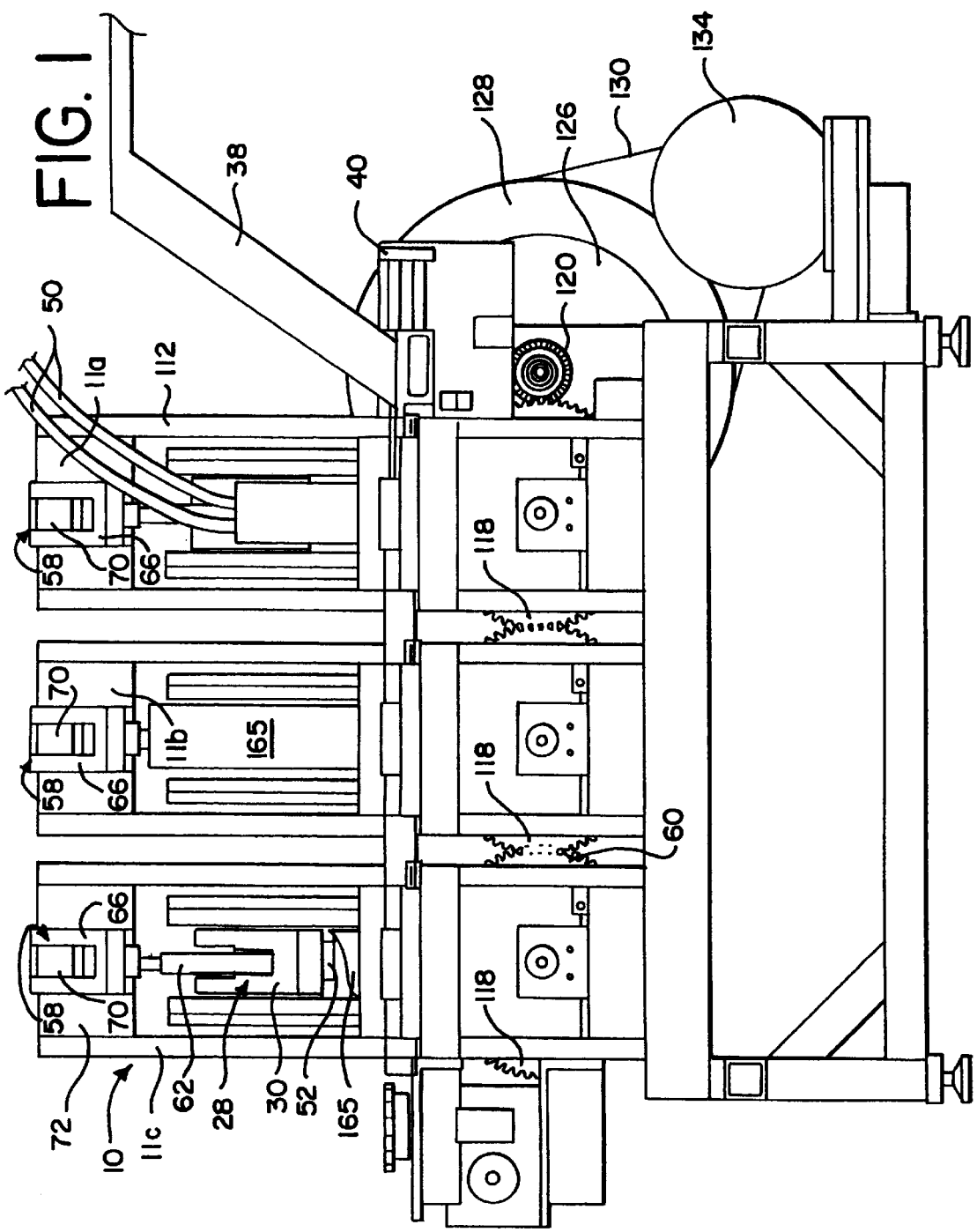
FIG. 1 is an elevation of an assembly apparatus with three assembly stations.

An assembly apparatus 10 incorporating the features of the present invention is illustrated in the accompanying drawings. The illustrated assembly apparatus 10 comprises three assembly stations 11a–11c for the assembly of a part of a roller chain or entire roller chain of the type shown in FIG. 5. Each illustrated assembly station has a single press system, with the individual stations arranged serially for assembling different parts of a particular chain product. The stations may comprise, for example, a pin link station, a block station, and a coverplate station. Although three stations are shown in FIG. 1, it should be understood that the principles of the present invention may be applied to systems and equipment using fewer or more assembly stations.

Figure 5:
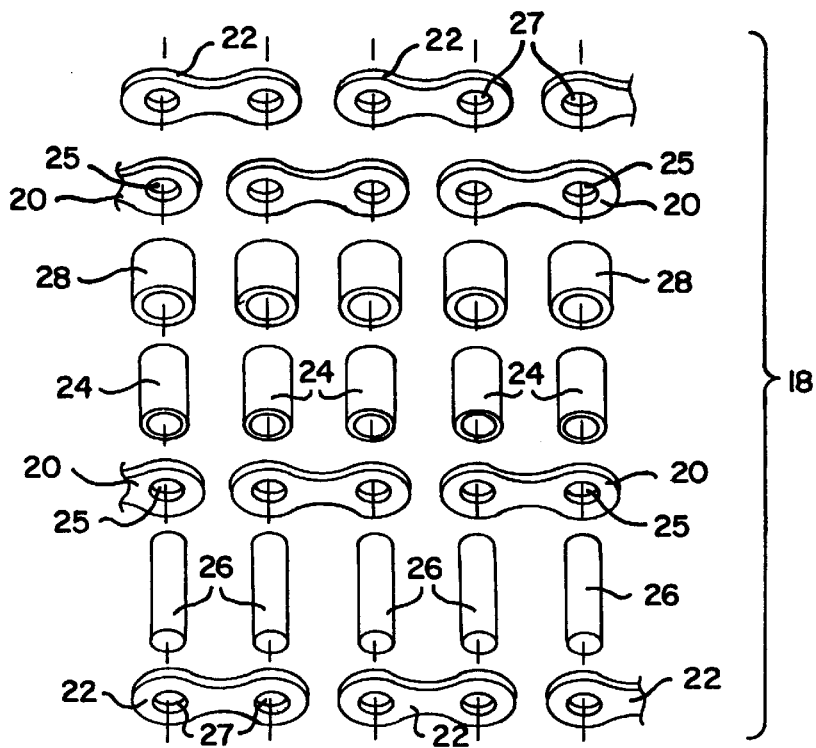
FIG. 5 is an exploded view of a roller chain that may be made with the assembly apparatus of FIG. 1.

A typical roller chain 18 that may be assembled with such equipment is shown in an exploded view in FIG. 5, and typically has a plurality of roller link plates 20 joined together by pin link plates 22. Each roller link plate 20 has a pair of bushings 24 press fit into holes in the roller link plate 20, and each pin link plate 22 has a pair of pins 26 press fit into holes 27 in the pin link plate 22. Each roller link plate 20 is pivotally connected to two adjoining pin link plates 22 with one pin 26 from each of the adjoining pin link plates 22 extending through one of the roller link plate bushings 24. Rollers 28 are mounted for rotation on the bushings 24. Such roller chain products 18 are useful in power transmission, and are usually load-bearing in operation. It is important in assembling such products that the press fit of the bushings 24 and pins 26 in the holes 25, 27 of their respective plates 20, 22 provide adequate strength and that the bushings 24 and pins 26 do not fail prematurely. To ensure that the press fit provides adequate strength, and to ensure that the chain parts and assembly equipment are not damaged during assembly, it is desirable that the pressing force exerted on the parts during assembly be predictable and monitored. In addition, the optimal pressing force may vary with the size of the chain components. Thus, for example, it may be desirable for the same equipment to be used at different times for assembling several different products, with the desired pressing force varying with the product.

Figure 3:
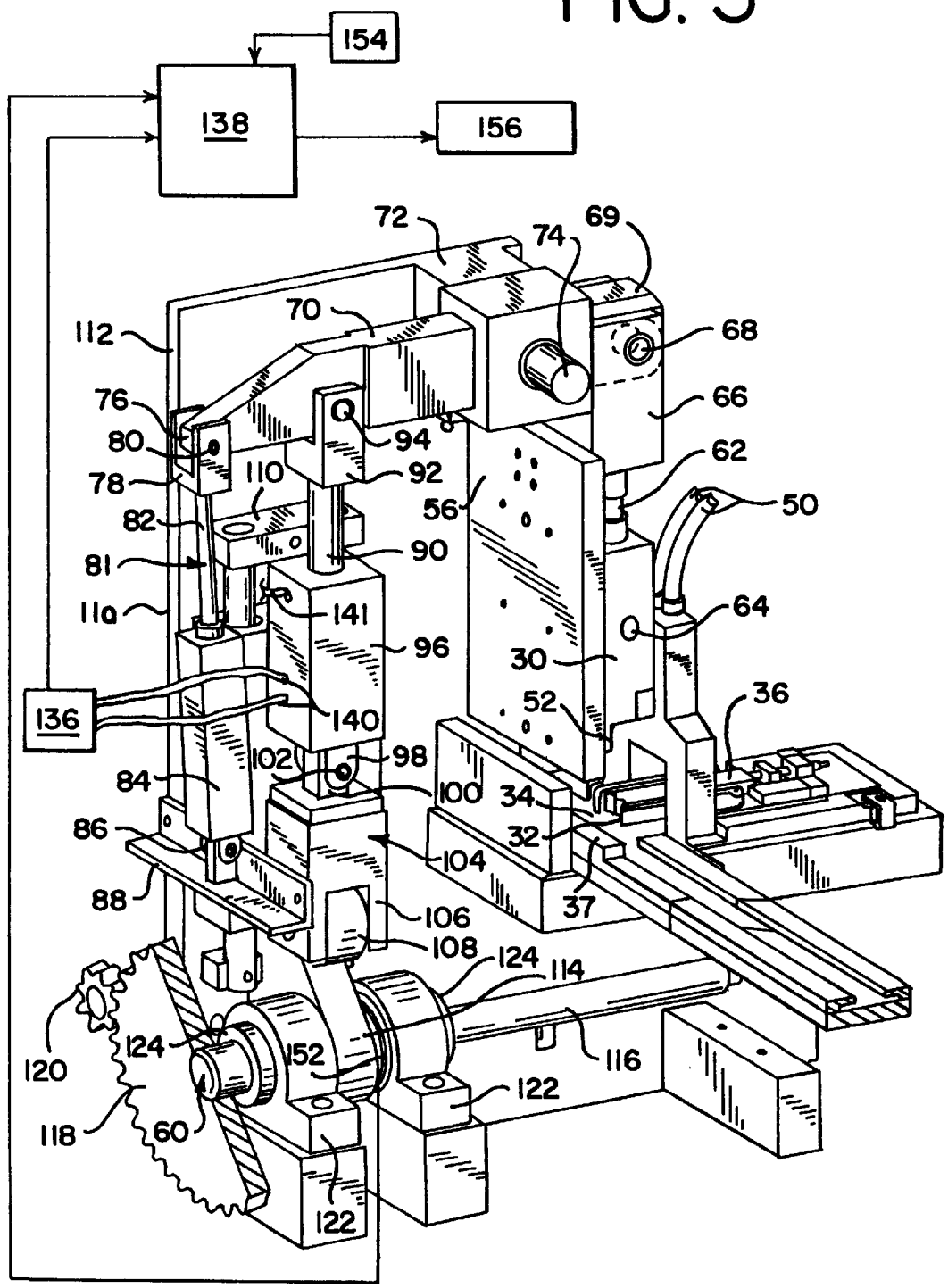
FIG. 3 is a perspective view of the back side of one of the assembly stations of the assembly apparatus of FIG. 1, with parts removed for clarity.

In such assembly equipment, at each assembly station 11a14 11c a pressing force is applied to the workpieces through a force-applying drive linkage 58. In the illustrated embodiment, the drive linkage 58 includes a force-applying ram 30 and a fixture 32 on or by which a first workpiece is held or supported. A second workpiece is held juxtaposed with the first workpiece by another fixture. The fixture 32 may comprise a flat, horizontal base 34, as shown in FIG. 3, or a horizontal locator 36, for example, shown in FIG. 3, that slides one of the workpieces into position and holds the workpieces in proper position until they are pressed together. It should be understood that these types of fixtures are identified for purposes of illustrated only, and that other structures may be used for the fixtures.

Figure 6:
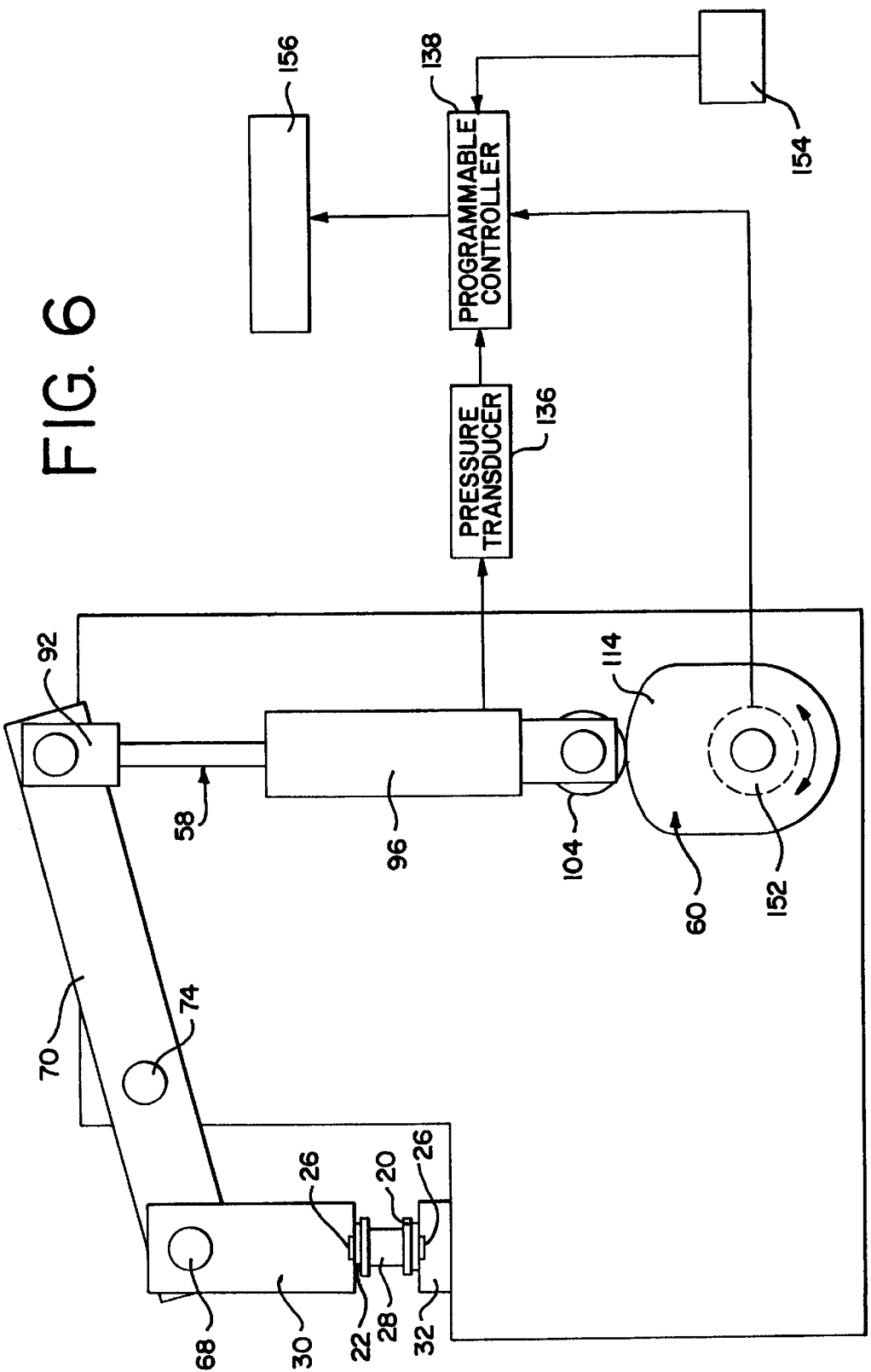
FIG. 6 is a schematic of one embodiment of the assembly apparatus of the present invention.
Figure 7:
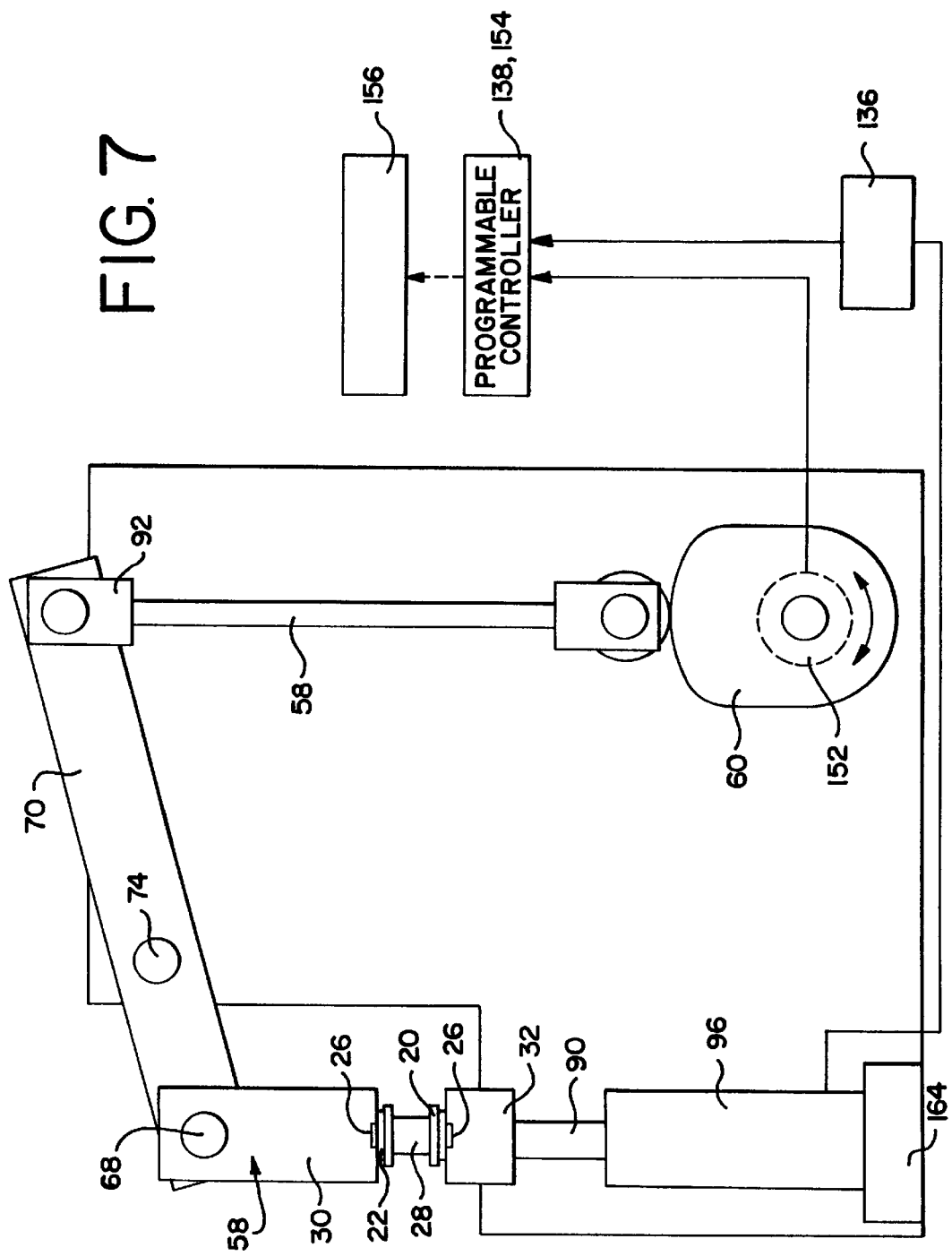
FIG. 7 is a schematic of another embodiment of the assembly apparatus of the present invention.

The workpiece may comprise, for example, the pins 26 and the pin link plates 22 or the bushings 24 and the roller link plates 20. In the schematics of FIGS. 6–8, the drawings show force being applied at a final assembly station, with a top cover pin link plate 22 being forced onto the ends of pins 26, although it should be understood that other assembly stations may be those where, for example, bushings are pressed into the holes 25 of the roller link plates 20, where rollers 28 are added, where roller link sub-assemblies are placed to connect pins 26 of adjacent pin link plates, or where pins 26 are pressed into the holes 27 of the bottom link plate 22, for example. It should be understood that the principles of the present invention may be used in assembling other workpieces as well, and may be used to assemble commercial products other than roller chain.

The first workpiece may be delivered to the fixture 32 through gravity feed or through some other standard sort of feed mechanism, such as the stack feed element 38 and push feed element 40 shown in FIG. 1, which may, for example, push a pin link plate 22 into position below the ram 30 of the first assembly station 11a. The second workpiece is delivered by a separate feed mechanism, such as the tubes 50, with the horizontally sliding locator 36 pushing the tube-fed elements, such as the pins 26, into position on the holes 27 of the pin link plate and holding them there until the pins are pressed into the holes by the ram 30. Both of the illustrated feed mechanisms comprise examples of means for delivering a workpiece. It should be understood that the illustrated means for delivering the workpieces are provided for purposes of illustration only; other means for delivering the workpieces may be used and are within the scope of the invention, including any prior art delivering means. For example, a horizontal locator slide may be used to push a link plate into position, and plates or sub-assemblies could be delivered through stacks of supplies such as shown at 165 in FIG. 1.

As shown in FIG. 3, the base 34 and the locator slides 36, and a complementary element 37 hold the workpieces in position as the ram 30 is moved downward to apply a compressive force against the two workpieces to press them together into the desired relationship. In the first illustrated embodiment, the fixture 32 is vertically fixed and the drive linkage 58 applies a vertical force to the workpiece. It should be understood that the fixture need not be fixed against movement in the direction of the force applied by the ram; the fixture could be mounted on a hydraulic cylinder or other cushioning device, and the hydraulic cylinder or other cushioning device may be anchored to a fixture on the press equipment, as shown in FIG. 7.

Figure 4:
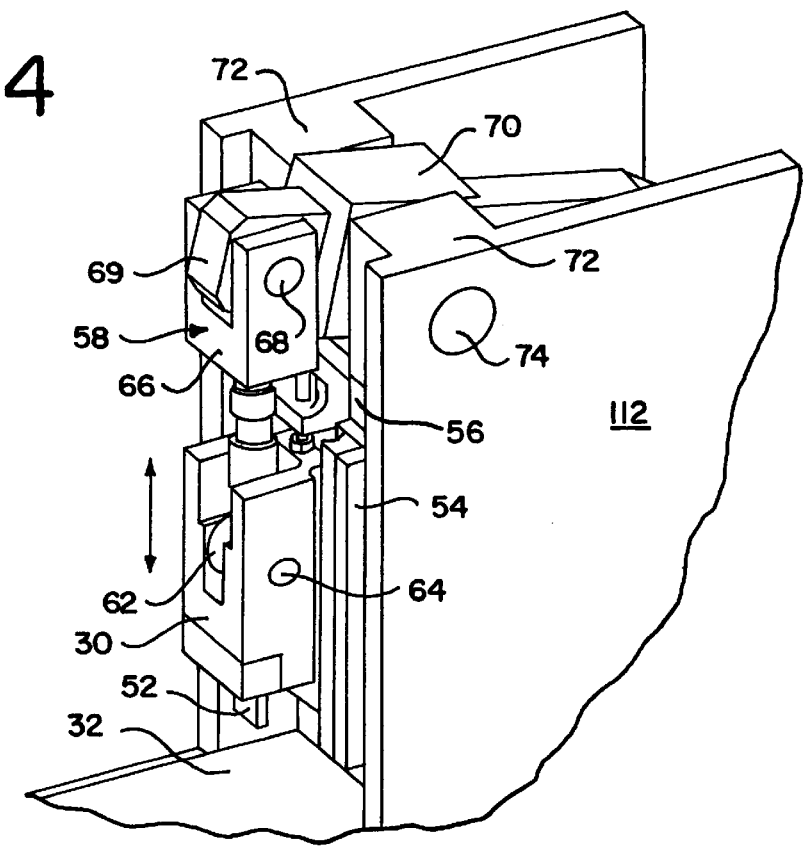
FIG. 4 is a partial perspective view of the front side of one of the assembly stations of the assembly apparatus of FIG. 1, with parts removed for clarity.

FIG. 4 illustrates a single station of the assembly apparatus of FIG. 1 with the horizontal locator slide 36, stack feed element 38 and push feed element 40 removed for purposes of illustration. As there shown, the illustrated drive linkage 58 includes the ram 30 to be applied to the workpieces and means for moving the ram. The illustrated ram 30 is linearly moveable in a vertical plane, up and down between positions toward and away from the workpieces on the fixture 32 during the assembly cycle. The bottom end of the ram 30 nearest the workpieces has a hammer 52 that is applied to the workpieces themselves. The load-applying position of the ram is nearest the workpieces. Guides on the illustrated press control the movement of the ram. As shown in FIG. 4, the ram 30 is mounted for vertical movement on the press with linear bearings 54 mounted on a vertical plate 56 to guide the linear movement of the ram. As will be understood by those skilled in the art, the hammer 52 at the end of the ram nearest the fixture 32 should be shaped according to the shape of the workpieces to be pressed.

The illustrated ram 30 is connected to the means for moving the linearly-movable ram. The illustrated means for moving the ram includes a rotatable drive train 60 connected to drive the linearly-movable ram through a plurality of load transmitting elements. The drive linkage 58 includes elements that translate the rotational movement of the rotatable drive train 60 into the linear movement of the ram 30.

As shown in FIGS. 3–4, the upper end of the illustrated ram 30 is connected to a rod 62 through a pivotal connecting pin 64. The opposite end of the rod 62 is connected to a clevis 66 that is connected through a clevis pin 68 to the front end 69 of a ram lever 70. Pivoting is permitted between the clevis pin 68 and the ram lever 70, and one or more bearings may be used to facilitate pivoting.

As shown in FIG. 3, the illustrated ram lever 70 is pivotally mounted on the press system frame 72 at a pivot 74. The pivot 74 for the ram lever 70 may comprise a pin and may have one or more bearings to permit free pivoting of the ram lever 70. The pivot 74 is between the front end 69 of the ram lever 70 and the back end 76 of the ram lever. The back end 76 of the illustrated ram lever 70 is pivotally connected to an air spring clevis 78 through an air spring clevis pin 80 so that the ram lever can pivot with respect to the clevis 78. The air spring clevis 78 is connected to the top end of an air spring assembly 81 comprising an air spring rod 82 telescopically received in an air spring barrel 84. The bottom end of the air spring barrel 84 is mounted through a pin 86 to a frame fixture 88; the bottom end of the air spring is free to pivot about the frame fixture but vertical movement is limited.

In the embodiment illustrated in FIG. 3, between the pivot 74 and the connection to the air spring clevis 78 at the back end 76 of the ram lever 70, the ram lever 70 is pivotally connected to a top end of a telescoping rod 90 through a clevis 92 and clevis pin 94. The ram lever 70 may pivot relative to the telescoping rod 90. The opposite end of the telescoping rod 90 is received in the top end of an hydraulic cylinder 96.

The bottom end of the hydraulic cylinder 96 has an hydraulic cylinder clevis 98 that straddles an eye bracket 100 and receives a clevis pin 102 for pivotally mounting the hydraulic cylinder clevis 98 to the eye bracket 100. The eye bracket 100 is connected to a cam follower assembly 104 comprising a block 106 and a roller 108. The cam follower roller 108 is mounted to the block 106 through a pin that allows for rotation of the cam follower roller 108.

In the embodiment illustrated in FIG. 3, movement of part of the drive linkage 58 is constrained to vertical movement through a connection of the cam follower block 106 to a linear bearing 110 that is mounted on a vertical wall 112 of the press frame 72; the cam follower roller 108 is however, free to roll about its pin connection. Movement of the front part of the drive linkage 58 is constrained to vertical movement through operation of the linear bearings 54 mounted on the front of the frame 72.

As shown in FIG. 3, the drive linkage's rotatable drive train 60 includes a rotatable cam 114 and rotatable means for driving the rotatable cam. The cam follower assembly 104 is biased to bear against the surface of the rotatable cam 114 by the air spring assembly 81. Other means may be used for translating the rotational motion of the rotatable drive train 60 into linear motion. Instead of a cam and cam follower, an eccentric or crank arrangement may be used.

In the illustrated embodiment, the rotatable means for driving the cam includes a cam shaft 116 on which the cam 114 is coaxially mounted. The cam shaft 116 is also coaxially mounted to a large gear 118 that is driven by a small gear 120 at the first station 11a. As shown in FIG. 3, the large gear 118 is coaxial with the cam 114, and the cam shaft 116 is fixed to the cam 114 and the large gear 118 so that they rotate as one. As shown in FIG. 1, the teeth of the large gear 118 from adjacent stations enmesh so that the rotation of the cam shafts 116 for each station can be tied and operation of the three stations may thereby be synchronized. As shown in FIG. 3, the illustrated cam 114 is mounted for rotation between two gussets 122: cam shaft guide bearings 124 are bolted to the top of the gussets 122 to allow for free rotation of the cam 114.

Figure 2:
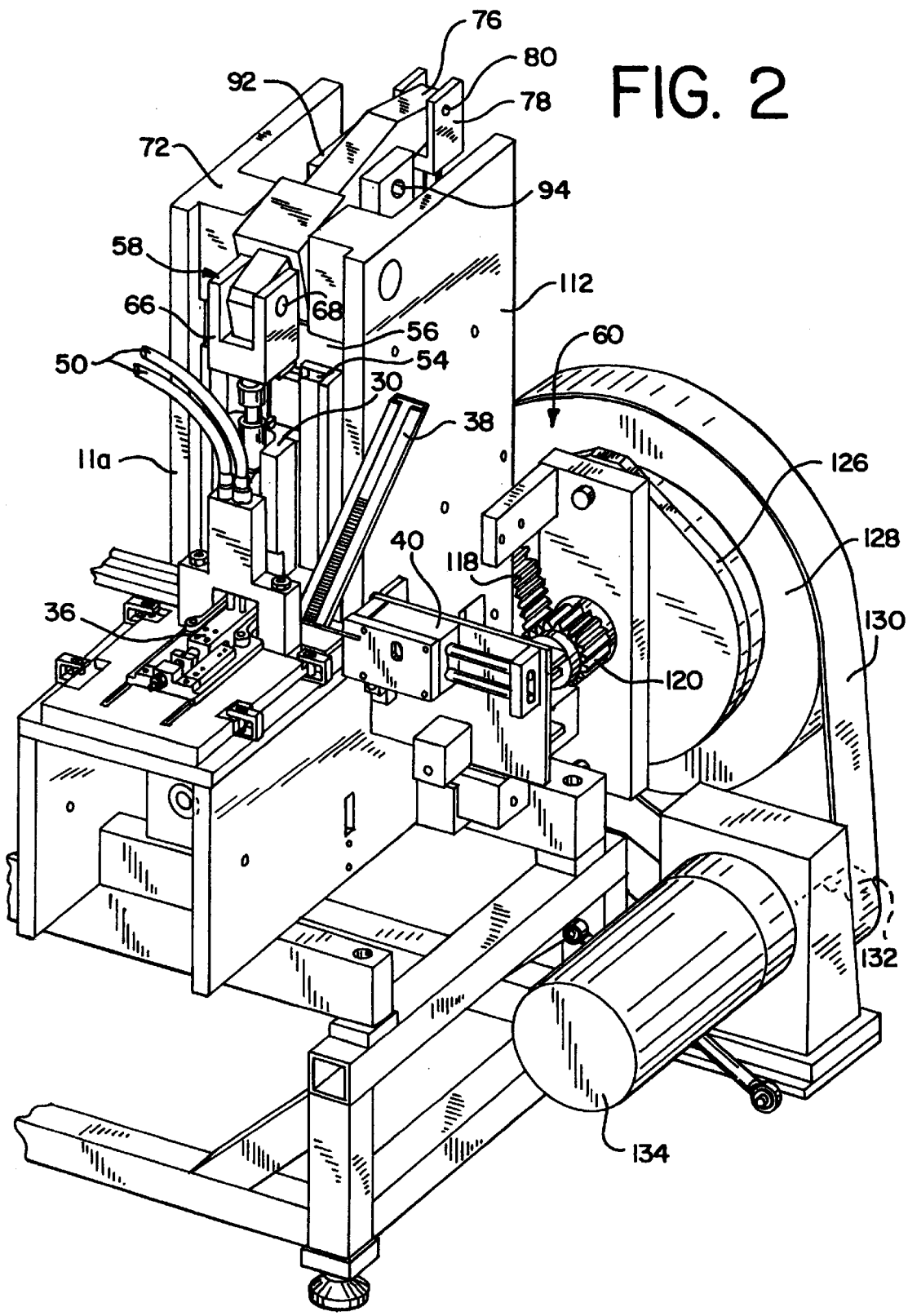
FIG. 2 is a perspective view of the front side of one assembly station of the apparatus of FIG. 1.

As shown in FIGS. 1–2. the small gear 120 in the illustrated embodiment is coaxially mounted with a clutch 126 that is driven by a flywheel 128. The flywheel 128 is rotated by a belt drive 130 that is driven by a gear 132, shown in phantom in FIG. 2, driven by a motor 134. The clutch 126 may be a friction clutch or other device known in the art, and the motor 134 may be an electric motor known in the art.

It should be understood that the above-described drive linkage 58 is described for purposes of illustration only. Other drive linkages may be used. It should also be understood that although the drive linkage 58 of one assembly station 11 has been shown, the other assembly stations have similar drive linkages, although the cams may have different shapes and orientations. It should also be understood that each assembly station would typically have another cam mounted on the assembly station drive shaft 116 to drive a cam follower and drive lug connected to move the horizontal locator slide 36.

Thus, for the embodiment illustrated in FIG. 4, it can be seen that the load existing in the linearly movable drive train can be controlled by controlling the pressure placed on the telescoping rod 90 by the hydraulic cylinder 96.

The present invention includes a means for determining the load existing in or applied through the drive linkage at each assembly station 11a–11c. The load-determining means determines the load in a part of the drive linkage 58. In the first illustrated embodiment, the load determining means comprises a means for determining the pressure in the hydraulic cylinder 96, comprising a pressure transducer 136 that determines the pressure in the hydraulic cylinder 96, and produces an electrical signal that is communicated to a programmable controller 138. The pressure transducer 136 and programmable controller 138 are shown in the schematic of FIG. 6. As shown in FIG. 3, feed lines 140 may be attached to receive hydraulic fluid from the hydraulic cylinder 96, feed the hydraulic fluid through the pressure transducer 136, and return the hydraulic fluid to the cylinder 96; alternatively, the transducer 136 could be in series in the hydraulic fluid feed line 141.

Although the present invention is not limited to any particular pressure transducer, an acceptable pressure transducer 136 that may be operable with the present invention is available from the Barksdale Controls Division of IMO Industries of Los Angeles, Calif. as a Barksdale Pressure Transducer, Model 403N1, Catalog No. Gauge 403N1-13CG-09-O with a pressure range of 0–3000 psi. Such a pressure transducer provides an electrical signal that communicates information on the pressure in the hydraulic cylinder, thereby allowing for monitoring of the pressure in the drive linkage and force being applied to the workpieces by the ram 30.

Although not limited to any particular hydraulic cylinder, an acceptable hydraulic cylinder 96 for use with the present invention is the Series HV848B available from Miller Fluid Power Corp. of Bensenville, Ill. This hydraulic cylinder has a two and one-half inch bore, a stroke of two and one-half inches, and is double acting, that is, it acts in both directions. With such a hydraulic cylinder, the operator can reverse the hydraulic pressure and back the ram up from the workpiece if there is a jam without reversing the motor. The pressure capacity of the hydraulic cylinder should be greater than necessary for regular assembly because the system must be able to withstand pressure spikes caused by out of tolerance press fits or pressure spikes caused by an equipment jam up due to misfed parts.

The hydraulic cylinder 96 may be made to act as a pressure relief in case of overload, with the cylinder opening a relief valve to relieve excess pressure in the system. Such a relief valve can be part of the hydraulic cylinder 96, and be of the type that automatically opens when the pressure in the cylinder exceeds a predetermined amount. Such a relief valve would not necessarily be tied to any stage or phase of the assembly cycle, but would serve merely as a fail-safe device to insure that the press system is not damaged through excess pressure.

The hydraulic cylinders 96 for all the assembly stations may be connected to a suitable pump device for delivering hydraulic fluid to the cylinder 96, with suitable conduits 141 for circulating the fluid from the pump to all three assembly stations. The conduits could each include a valve in the line for control of the entry or emptying of hydraulic fluid from the cylinder 96. For press systems with several assembly stations, there could be a single hydraulic pump provided to feed the hydraulic cylinders 96 at all of the stations, with a multiple valve system between the pump and hydraulic cylinders.

The present invention also provides means for determining the stage of the assembly cycle at each assembly station 11*a*–11*c*. In the illustrated embodiment, this stage determining means comprises a means for determining the rotational position of one of the rotatable parts of the rotatable drive train 60. In the illustrated embodiment, this means comprises a resolver 152 mounted on the rotatable cam 114, shown schematically in FIGS. 6–8. The resolver 152 produces an electrical signal that is communicated to the programmable controller 138; the electrical signal corresponds with the rotational position of the cam 114. Since the rotational position of the cam relates to the stage or phase of the pressing cycle, the pressure transducer and resolver together provide information on the amount of pressure being exerted by the ram at a particular stage of the pressing cycle. Although not limited to any particular resolver, an acceptable device for determining the phase of the press-fit assembler is a resolver available from Advanced Micro Controls Inc. of Terryville, Conn. under the designation H25-FE. It should be understood that the resolver is identified for purposes of illustration only; the present invention is not limited to a particular resolver, and other means could be used for determining the stage of the assembly cycle could be used. Such an alternative means could provide an indication of the stage of the assembly cycle through switches or microswitches based at various positions on one of the elements or on the frame, such as a limit switch or other device producing an electrical signal indicating that an element of the drive train has reached a certain position.

The present invention also provides means for correlating the stage of the assembly cycle and the load or pressure as determined for each assembly station 11*a*–11*c*. In the illustrated embodiments, this correlating means comprises the programmable controller 138 that receives input from both the resolver 152 and the pressure transducer 136 of each assembly station 11*a*–11*c*. The illustrated programmable controller 138 also comprises a data storage means 154 for storing information related to the preferred load or range of tolerable loads at a stage in the assembly cycle and means for correlating the preferred load at a stage in the assembly cycle with each rotational position and pressure determined. The programmable controller 138 is essentially a computer programmed to store this data, serving as the data storage device 154, receives input from the transducer 136 and the resolver 152 and make the appropriate comparisons. With information on the stage of the pressing cycle and amount of pressure, the programmable controller can correlate the pressure and the phase of the assembly cycle to give a comparison with the optimal pressure at that stage. A commercially available computer or programmable controller device may be used. Although not limited to any particular programmable controller, an acceptable programmable controller is available from the Allen-Bradley Company of Milwaukee, Wis. as the SLC 500 series. Software such as Allen-Bradley "APS" No. 1747-PA2E should be acceptable for use. It should be understood that other computers and software could be used, and the correlation could also be done manually from information communicated from the other elements.

The programmable controller 138 may incorporate or be connected to a means for communicating information related to the load as determined, which may communicate information related to the correlated information, shown schematically in FIGS. 6–8. A suitable communications means could be a simple alarm device, to produce an audible warning beeper or visual signal to communicate an unacceptable deviation between the preferred load and the determined load or pressure at some stage in the assembly cycle. The communicating means 156 could also comprise a visual display device 160, such as a computer monitor or a printer, printing out of pressure ranges. The communicating means could also comprise a device that creates a machine readable record of the production, such as a computer disk, tape, cd rom, or the like. The programmable controller 138 could also be connected to an actuator that would automatically stop operation of the press if it is determined that the press is operating outside of a pre-selected range of loads. For some operations, it may be desirable to include a control means, such as valve for controlling the flow of hydraulic fluid into or out of the hydraulic cylinder 96, to thereby continuously maintain a desired pressure in the hydraulic cylinder. If the same equipment is later used for a different product with a different desired compressive load, the desired pressure could be adjusted for each hydraulic cylinder. A suitable actuator could be used to adjust each valve. The control means could also be connected to control the pump supplying hydraulic fluid, to deactivate the pump if an excessive pressure is determined to exist, or to adjust the pump speed to decrease or increase the pressure in the system as desired. In this way, continuous feedback can be used to ensure that the pressure in the drive linkage remains at some optimum level throughout the phases of the assembly cycle.

The communication means could also be part of the programmable controller 138 itself. Thus, the programmable controller 138 may itself incorporate the data storage means 154, as shown schematically in FIGS. 7–8, means for correlating the stage of the assembly cycle and load as determined, means for comparing the stored data on preferred loads with the rotational position and load as determined, and means for communicating information related to the existing load as determined, correlated information or comparison.

An alternate means for correlating the stage of the assembly cycle and load as determined could comprise a relay logic circuit. Such a logic circuit could be set up so that a relay is closed if, for example, the press is in a particular position, and another relay could be closed if the load determined in the drive linkage fails to reach a certain level, with the means for communicating the correlated information set to act if both relays are closed. Other relay logic circuits could be set up to correlate the information and actuate the communication device.

In an alternate embodiment, shown schematically in FIG. 7, with like numbers used for like parts, the hydraulic cylinder 96 is mounted between a movable fixture 32 and a fixed base 164, so that pressure is measured below the workpieces being pressed 22, 26.

In another alternate embodiment, shown in FIG. 8, where like numbers have been used for like parts, there is no hydraulic cylinder, but pressure is measured through an alternate form of transducer, a load sensing clevis pin 166 positioned between the ram 30 the ram lever 70. Such a load-sensing clevis pin comprises another possible means for determining the load existing in the drive linkage, or means for determining the load in a part of the linearly movable portion of the drive train; a suitable load sensing clevis pin is available from the Strainsert Company of West Conshohocken, Pa., and sold under the designation Model No. CPA-1.5, with a capacity of 30,000 pounds. This product has an internal load sensing strain gage, and reference is made to U.S. Pat. No. 3,695,096. The output from the gage could be connected to an input on the programmable controller 138 instead of using the pressure transducer described above. Such a strain gage could be used at other positions in the drive train or linkage, or at the fixture to determine the pressure exerted on the workpiece. For example, a load-sensing clevis pin could be substituted for either of pins 94 or 102.

To operate the apparatus or systems of FIGS. 1–8, one may first determine the preferred load to be applied by the ram on the workpiece, or a range of preferred loads, and store information related to the preferred load in the data storage means 154. The elements to be pressed together may be loaded into storage receptacles 38, 50, 165 associated with the feed mechanism at each station and the motor 134 started, as known in the art. In the illustrated embodiment, the motor 134 rotates its drive shaft which rotates the gear 132, and the rotation of the gear 132 causes the belt drive 130 to travel, which rotates the flywheel 128. The rotation of the illustrated flywheel 128 causes one side of the clutch 126 to rotate, which in turn rotates the other side of the clutch 126 through friction or the like. Rotation of the clutch 126 causes the coaxial small gear 120 to rotate, and with the rotation of the small gear 120, its gear teeth drive the enmeshed gear teeth of the large gear 118, causing the large gear to rotate. The large gear 118 of the first assembly station 11*a* drives the large gear 118 of the second assembly station 11*b*, which drives the large gear 118 of the third assembly station 11*c*. The large gears of all three stations are coaxial with the cam shaft 116 of each station, and all three cam shafts 116 rotate with the rotation of the large gears, causing the coaxial cams 114 to rotate. Alternatively, it may be desirable to combine the present invention with that disclosed in the patent application filed concurrently herewith by David C. Armenoff and David J. Frey, and assigned to Amsted Industries, Inc. and entitled "Apparatus, Kit and Method for Roller Chain Assembly", the disclosure of which is incorporated by reference herein in its entirety. It should be understood that operation of the system will vary if other drive linkages are employed, and the invention is not limited to the illustrated drive linkage.

At each assembly station 11*a*–11*c*, as the cam 114 rotates in the illustrated drive linkage 58, the cam bearing surface pushes upward against the cam follower roller 108, pushing and the cam follower assembly 104 upward on the hydraulic cylinder 96. Information related to the rotational position of the cam 114 is determined by the resolver 152 mounted on the cam; the rotational position of the cam 114 relates to the phase or stage of the assembly cycle, and the information related to the stage of the assembly cycle for that assembly station 11*a*–11*c* is communicated to the programmable controller 138 for the system of apparatus. As the hydraulic cylinder 96 is pushed upward by the cam follower assembly 104, the hydraulic cylinder pushes upward on the telescoping rod 90, moving the telescoping rod 90 upward. The amount of upward thrust on the telescoping rod 90 depends on the hydraulic pressure in the cylinder 96. The pressure in the cylinder is maintained at a predetermined level by the pump 144 and valves 150, and the hydraulic pressure is measured by the transducer 136, and this information is communicated to the programmable controller 138. The programmable controller 138 correlates the information on the pressure as determined from the pressure transducer 136 with information on the stage or phase of the assembly cycle from the resolver 152. The programmable controller 138 retrieves information from the data storage device 154, or from its internal mechanisms, related to the preferred load or preferred range of loads, and compares the retrieved information with the information determined as to the load and stage of the assembly cycle. The press system may than respond to the correlated information, to the results of the comparison, or both.

If the comparison shows no deviation in the determined pressure and assembly stage from the predetermined value or range of values, the assembly process may continue. The upwardly moving telescoping rod 90 pushes upward on the telescoping rod clevis 92, which pushes upward on one end of the ram lever 70, causing the ram lever to pivot about its pivot 74, pushing the ram lever's front end 69 downward. As the front end 69 of the ram lever 70 pivots downward, it pushes downward on the clevis pin 68 which pushes downward on the clevis 66. The downward movement of the clevis 66 forces the ram 30 and hammer 52 downward against the workpieces, forcing the workpieces together. Depending on the communicating means 156 employed in the system, continuous or periodic pressure readings and assembly stage could be communicated through a visual display device or the like. Thus, for example, a quality control record could be made for each product, with information communicated to a machine readable data storage medium, such as a computer disk or to a printer for recording on paper.

If the comparison shows some unacceptable deviation from the predetermined values for the preferred load or range of loads, the programmable controller 138 could be set up to initiate a response to this information in a variety of ways. The programmable controller 138 could communicate this information by actuating an alarm, or through a visual display for example, to alert a worker that something is amiss.

An hydraulic cylinder pressure relief valve could also open at a predetermined pressure to relieve pressure in the system and prevent catastrophic operation of the equipment. Such a pressure relief valve could also be used as a fail safe device in combination with a programmable controller and the means for communicating information 156.

Thus, the present invention allows for continuous monitoring of the pressure or force exerted during the assembly operation at each of a plurality of assembly stations, to assure not only that excessive force is avoided, but to ensure that adequate force is applied, and giving the option of providing a quality control record.

If the embodiment of FIG. 8 is used wherein there is no hydraulic cylinder, information related to pressure or load is communicated to the programmable controller 138 from the load sensing clevis pin 166. Operation of the system is similar to that described above, except instead of pushing upward on the hydraulic cylinder, a rod 168 extends between the cam follower assembly 104 and the clevis 92. Stress readings and cycle phase readings may be determined and communicated and correlated in the programmable controller, which may similarly be connected to a communication means. The same communication means as described above could be used in such a system.

In the embodiment of FIG. 7, the hydraulic cylinder 96 is located beneath the fixture 32 holding the workpieces, and the pressure is measured by the transducer 136 associated with this hydraulic cylinder 96. The fixture 32 in this embodiment is vertically movable and is connected to the hydraulic cylinder 96 through a telescoping rod 90. The method is the substantially the same as that described above, except that the load is applied to the workpieces without passing through the hydraulic cylinder and telescoping rod, and the load on the fixture is measured by the transducer.

The method of the present invention may be used with any of the illustrated embodiments. In the method, the load existing in through the drive linkage 58 is determined, and the rotational position of the rotatable part of the drive train 60 is determined. The information related to the existing load and rotation position are correlated and a communication is made to relate to the load information, which may include the correlated information. The method may also include the step of retrieving information that defines a preferred load to be applied by the ram in the assembly cycle and comparing the existing load determined and assembly cycle stage with the retrieved information defining the preferred load at the cycle stage; in this method, the step of communicating information related to the existing load may include communicating information related to the results of the comparison. The step of determining the load existing in the drive linkage may include the step of determining the load transmitted through the load transmitting member.

Thus, the present invention achieves the benefits of both mechanical presses and hydraulic ones. It has the efficiency and high production rates of a mechanical press system and allows for tying adjacent assembly stations together to keep them in phase.

While only specific embodiments of the invention have been described and shown, those in the art should recognize that various modifications and additions can be made thereto and alternatives used. In addition, it should be recognized that the present invention has applications beyond the illustrated environment. It is, therefore, the intention in the appended claims to cover all such modifications, additions and alternatives and applications as may fall within the true scope of the invention.

We claim:

1. An assembly apparatus comprising: a drive linkage for applying a load to workpieces, the drive linkage including a linearly movable ram and a rotatable drive train for moving the ram between a plurality of positions toward and away from the workpieces during an assembly cycle, the drive linkage further including means for translating rotational movement of the rotatable drive train into the linear movement of the ram;

the assembly apparatus further including at least one additional linearly movable element mechanically tied to said rotatable drive train for movement between a plurality of positions during the assembly cycle, movement of the at least one additional linearly movable element being coordinated with movement of said ram;

a motor for rotation of said rotatable drive train for movement of said ram and said, additional linearly movable element;

means for determining the load existing in the drive linkage by detecting a characteristic of an element other than said motor;

means for determining the stage of the assembly cycle; and means for communicating information related to the existing load as determined.

2. The assembly apparatus of claim 1 wherein the means for determining the stage of the assembly cycle comprises a resolver connected to determine the rotational position of an element of the rotatable drive train.

3. The assembly apparatus of claim 1 wherein the drive linkage includes a load transmitting member and wherein the means for determining the load existing in the drive linkage comprises a transducer connected to determine the load in the load transmitting member.

4. The assembly apparatus of claim 3 wherein the load transmitting member comprises an hydraulic cylinder and wherein the means for determining the load existing in the drive linkage comprises a pressure transducer for determining the pressure in the hydraulic cylinder.

5. The assembly apparatus of claim 3 wherein the drive linkage includes two members pivotally connected and the load transmitting member comprises a pin pivotally connecting the two members, and the means for determining the load existing in the drive linkage comprises a transducer connected to measure the load on the pin.

6. The assembly apparatus of claim 1 further comprising means for correlating the stage of the assembly cycle and load as determined and wherein the means for communicating information related to the existing load as determined communicates information related to correlated information.

7. The assembly apparatus of claim 1 wherein the apparatus is part of a system that includes means for correlating the stage of the assembly cycle and load as determined and data storage means storing desired parameters for operation of the system and wherein the means for correlating the information compares the determined information with information stored in the data storage means to determine whether the existing load is outside of the desired parameters stored in the data storage system for that stage in the cycle.

8. An apparatus for assembling a product comprised of a plurality of workpieces, the apparatus operating in an assembly cycle having a plurality of stages and including:
   a plurality of serially-arranged assembly stations, each assembly station including a drive linkage including a rotatable drive train and a linearly movable ram driven by the rotatable drive train, each linearly movable ram being movable between a plurality of positions including a load-applying position during the assembly cycle, said rams being positioned to apply non-opposing loads;
   each assembly station having non-rotating elements including a fixture and a load-transmitting element in the drive linkage between the ram and the rotatable drive train;
   the rotatable drive trains of said assembly stations being mechanically tied together for coordinated rotation of said drive trains so that movement of the ram of one assembly station is coordinated with movement of the ram of the other assembly station;
   each assembly station including means for determining the load existing in the drive linkage by detecting a characteristic of one of said non-rotating elements;
   each assembly station including means for determining the stage of the assembly cycle of that assembly station; and
   the apparatus including means for correlating the stages of the assembly cycle and existing loads as determined and means for communicating information related to the existing loads as determined.

9. The apparatus of claim 8 wherein the linear position of each ram throughout the assembly cycle is related to the rotational position of the rotatable portion of the drive linkage, and wherein the means for determining the stage of the assembly cycle comprises means for determining the rotational position of an element of the rotatable drive train; the apparatus further comprising:
   data storage means for storing information related to a preferred load for each assembly station at a stage in the assembly cycle; and
   means for comparing the information related to the preferred load with each rotational position and pressure determined.

10. The apparatus of claim 9 wherein the data storage means stores information related to the minimum load for each assembly station at a stage in the assembly cycle.

11. The apparatus of claim 8 wherein the drive linkage includes an hydraulic cylinder and the means for determining the load existing in the drive linkage comprises a transducer connected to determine pressure in the hydraulic cylinder.

12. The apparatus of claim 8 wherein the drive linkage includes two members pivotally connected by a load transmitting pin and the means for determining the load existing in the drive linkage comprises a transducer connected to measure the load on the pin.

13. The assembly apparatus of claim 1 wherein said rotatable drive train includes a drive shaft and said means for translating rotational movement of the rotatable drive train into the linear motion of the ram comprises a cam and a cam follower, said cam being mounted for rotation on said drive shaft.

14. The assembly apparatus of claim 13 wherein said means for determining the stage of the assembly cycle comprises a resolver connected to determine the rotational position of said cam and said means for determining the load existing in the drive linkage comprises a hydraulic cylinder positioned in the drive linkage between the cam follower and the ram and a pressure transducer connected to sense the pressure in the hydraulic cylinder.

15. The apparatus of claim 8 wherein each of said rotatable drive trains includes a drive shaft and each assembly station includes a cam and the non-rotating load-transmitting element comprises a cam follower, each of said cams being mounted for rotation on one of said drive shafts.

16. The assembly apparatus of claim 15 wherein each of said means for determining the stage of the assembly cycle comprises a resolver connected to determine the rotational position of one of said cams and each of said means for determining the load existing in the drive linkage comprises a hydraulic cylinder positioned in the drive linkage between one of said cam followers and one of said rams and a transducer connected to sense the pressure in the hydraulic cylinder.

17. An apparatus for assembling roller chain comprised of a plurality of bushings press-fit into roller link plates and pins press-fit into pin link plates, the apparatus operating in an assembly cycle having a plurality of stages and including:
   a plurality of assembly stations, each assembly station including a drive linkage including a rotatable drive train and a linearly movable ram driven by the rotatable drive train, each linearly movable ram being movable between a plurality of positions including a load-applying position during the assembly cycle;
   each assembly station having a plurality of non-rotating elements including a fixture and a load-transmitting element in the drive linkage between the ram and the rotatable drive train;
   the rotatable drive trains of said assembly stations being mechanically tied together for coordinated rotation of said drive trains so that movement of the ram of one assembly station is coordinated with movement of the ram of the other assembly station;
   at least one of said assembly stations defining a press-fit station for press-fitting link plates and other elements together, said press-fit station including means for determining the load existing in the drive linkage of that station;
   said apparatus further including means for determining the stage of the assembly cycle, means for correlating the stage of the assembly cycle and existing load as determined, and means for communicating information related to the existing load as determined.

* * * * *